United States Patent Office 3,313,657
Patented Apr. 11, 1967

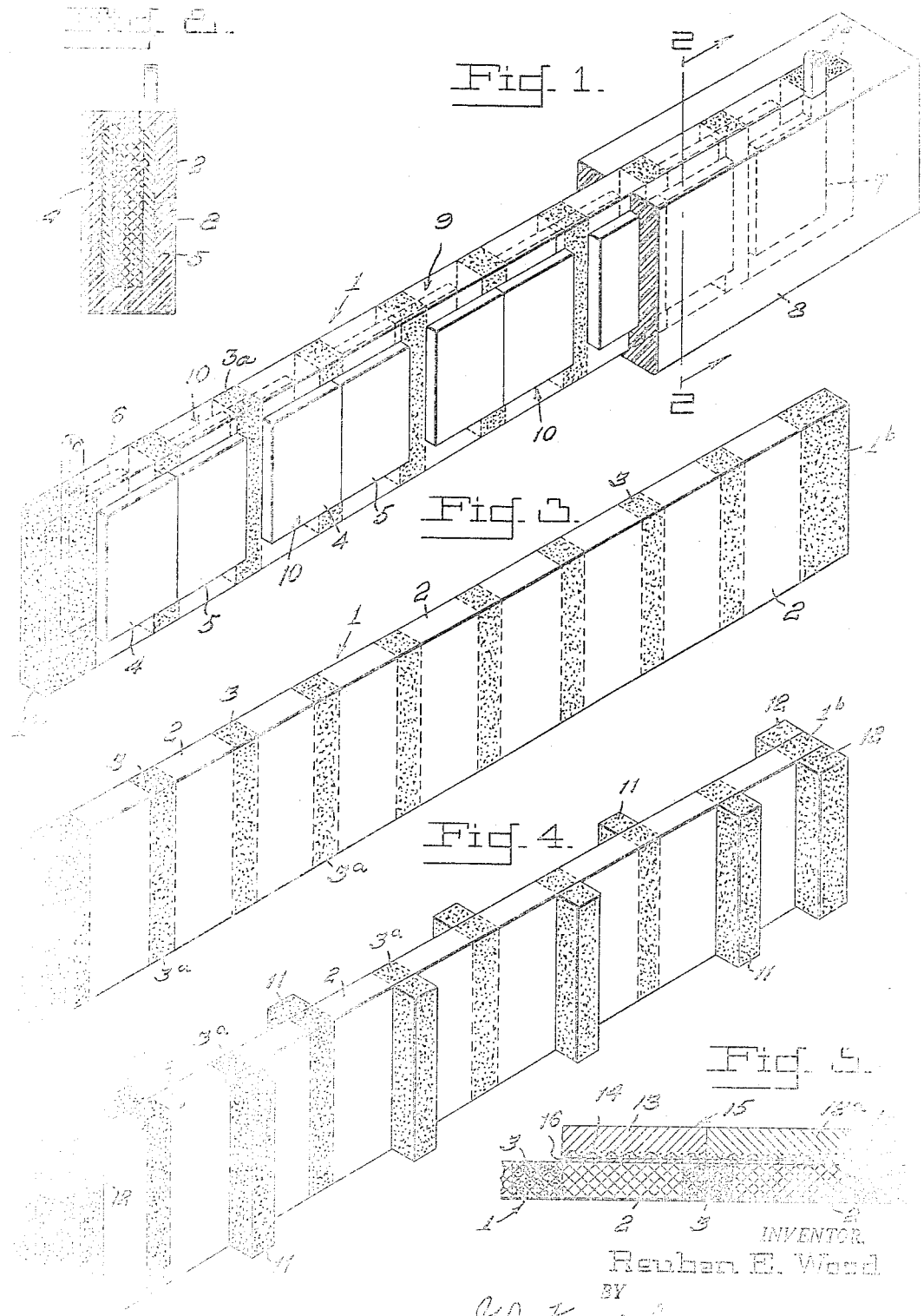

3,313,657
COMPACT RESERVE TYPE STRIP BATTERY
Reuben E. Wood, Washington, D.C., assignor to the United States of America as represented by the Secretary of the Army
Filed Nov. 19, 1951, Ser. No. 257,170
5 Claims. (Cl. 136—90)

The invention described herein may be manufactured and used by or for the Government for governmental purposes without the payment of any royalty thereon.

This invention relates to reserve type batteries and more particularly to a strip battery wherein the electrolyte is injected into the cells of the battery at the time of use.

In electrically operated artillery fuses and the like a compact source of electrical energy is required. This source of electrical energy must meet various conditions of use such as indefinite shelf life, instant activation, operation over a wide range of temperatures and occupying minimum space. The battery of the invention meets the aforementioned requirements and is economically and easily manufactured.

The specific nature of the invention as well as other objects and advantages thereof will clearly appear from the following description and accompanying drawings in which:

FIGURE 1 is a perspective view of a preferred embodiment of the invention with parts broken away.

FIGURE 2 is a cross-sectional view taken generally along line 2—2 of FIGURE 1.

FIGURE 3 is a perspective view of the separator of the battery shown in FIGURE 1.

FIGURE 4 is a perspective view of a modification of the separator.

FIGURE 5 is a plan view in cross section showing a modification of the battery plate assembly.

Referring now to FIGURE 1 of the drawings wherein is shown a separator 1 comprising a strip of woven glass fabric or similar material and a non-conducting, non-porous, electrolyte repellent material impregnated in the strip at spaced intervals 3a so that the separator 1 is divided into porous material sections 2 and electrolyte repellent material sections 3. The porous material sections 2 serve as receiving sections for the electrolyte. The ends 1a and 1b of the separator are similarly impregnated. The impregnation is necessary to prevent short circuiting of physically adjacent but not directly connected cells and to prevent electrolytic action between the plates of directly, electrically connected cells. By electrolyte repellent material is meant a material which is not wet by the electrolyte, for example, paraffin wax.

On each of the vertical sides of the separator there is a row of spaced plates 10 affixed to the separator 1. Each of the plates 10 comprises anode and cathode elements 4 and 5, respectively. The row of plates on one side of the separator are disposed in staggered relationship to the row of plates on the other side, so that the anode element of a plate on one side is disposed oppositely the cathode element of a plate on the other side of the separator and the anode element of this plate disposed oppositely the cathode element of the plate on the aforementioned one side adjacent the first mentioned plate. Each of the plates are positioned over two porous material sections 2 and an electrolyte repellent material section 3 therebetween so as to include the electrolyte receiving sections 2 between their respective anode and cathode elements. By the foregoing description, it can readily be seen that any desired number of plates may be affixed on the separator 1 and provided with the necessary impregnated sections to obtain a battery of series connected cells and thus have a highly efficient, compact strip type of reserve battery. The battery is terminated at the end 1a by means of a cathode element 6 which extends from the impregnated end 1a to the first impregnated section 3 and forms with the anode element of the plate on the opposite side of the separator, the first cell of the battery. The last cell of the battery is similarly formed by the anode element 7. The assembly comprising the separator and printed plates is coated with paraffin wax 8 or any suitable electrolyte repellent material with the exception of the top edge 9 of the separator to permit the admission of electrolyte to the sections 2. In its inactive state, the battery is maintained in a dry condition, but when activated an electrolyte is injected into the sections 2 through the top edge 9 of the separator by any appropriate means.

FIGURE 4 shows a modification of the separator 1 wherein shortcircuiting of adjacent or neighboring cells through the electrolyte is largely or completely prevented, as well as, obtaining a separator of relatively great mechanical strength. Each of the impregnated sections 3a is provided with spaced bosses 11 along the vertical side of the separator. The bosses 11 may be of the same or similar non-conducing, non-porous, acid repellent material used in impregnating the sections 3. The ends 1a and 1b of the separator are provided with bosses 12, similar to bosses 11, on each of the vertical sides. The bosses 11 intermediate the ends are arranged so that adjacent bosses are disposed on opposite vertical sides to accommodate the plates comprising the anode and cathode elements of the battery as illustrated in FIGURE 1.

One means for affixing the plates 10 to the separator 1 is shown in FIGURE 5 wherein a battery composition of lead 13 and another of lead dioxide 13a are forced into a nickel mesh 14 thus forming a plate 15 having cathode and anode elements connected in series. The edges of the wire mesh side of the plate 15 are glued, as indicated by reference 16, to the separator 1 so as to embrace two of the electrolyte receiving sections 2. Any number of plates 15 may be adhered to the separator 1, in accordance with the arrangement shown in FIGURE 1, to form a flat strip battery. The plates 10 may also be affixed to the separator 1 by printing the plates 10 on the separator 1. If desired, the flat strip battery may be made in cylindrical form to fit in an annular chamber of an electronic or electric fuse, or shaped to embrace the housing of electronic apparatus of a fuse or any other device which is to be powered by the battery.

It will be apparent that the embodiment shown is only exemplary and that various modifications can be made in construction and arrangement within the scope of the invention as defined in the appended claims.

I claim:
1. A reserve type battery which is activated by applying an electrolyte thereto, said battery comprising in combination: a separator comprising a long thin strip of porous material and a non-conducting, non-porous electrolyte repellent material impregnated in said strip at spaced intervals so that said separator is divided into porous material sections and electrolyte repellent material sections, said porous material sections serving as receiving sections for said electrolyte; a plurality of plates longitudinally positioned on both sides of said separator, each of said plates being positioned over two porous material sections and an electrolyte repellent material section therebetween, one portion of each of said plates serving as an anode element, and the other portion serving as a cathode element, the plates on one side of said separator being staggered in relation to the plates on the opposite side of said separator so that said anode and cathode elements of the plates on one side are positioned opposite the cathode and anode elements respectively of the corresponding plates on said opposite side to form a strip battery of series con- nected cells; means for affixing said plates to said separator; and electrolyte repellent material completely coating said separator and said plates except for one edge of said separator, said electrolyte being injected into said porous material sections along said one edge to activate said battery.

2. The invention in accordance with claim 1 wherein said strip of porous material is a strip of woven glass fabric, and wherein said electrolyte repellent material is paraffin wax.

3. The invention in accordance with claim 1 wherein said electrolyte repellent material sections are formed to have bosses projecting alternately in opposite directions from the sides of said strip.

4. The invention in accordance with claim 1 wherein each of said plates comprises a wire mesh and a composition of metal forced into said mesh to form a plate, and wherein said means for affixing comprises glue means between said plate and said separator.

5. The invention in accordance with claim 4 wherein said mesh is made of nickel, and said composition of metal comprises a composition of lead dioxide forced into said mesh to form one portion of said plate and a composition of lead forced into said mesh to form the other portion of said plate.

References Cited by the Examiner

UNITED STATES PATENTS 2,050,173   8/1936   Gordon _____ 136—100

FOREIGN PATENTS 668,569   7/1929   France.

WINSTON A. DOUGLAS, *Primary Examiner.*

ROGER L. CAMPBELL, LEON D. ROSDOL,
*Examiners.*

C. D. QUARFORTH, W. A. KEMMEL, A. SKAPARS,
*Assistant Examiners.*